United States Patent [19]
Kota

[11] Patent Number: 5,231,896
[45] Date of Patent: Aug. 3, 1993

[54] EXHAUST BRAKING CONTROL APPARATUS

[75] Inventor: Joji Kota, Shizuoka, Japan

[73] Assignee: Jatco Corporation, Japan

[21] Appl. No.: 846,058

[22] Filed: Mar. 5, 1992

[30] Foreign Application Priority Data

Mar. 25, 1991 [JP] Japan .................................. 3-84793

[51] Int. Cl.$^5$ .......................... F02D 9/06; F16H 61/12
[52] U.S. Cl. ...................................... 74/861; 192/4 A; 123/323
[58] Field of Search ...................... 192/4 A, 4 B, 1.23, 192/1.25; 123/323; 74/861, 856

[56] References Cited

U.S. PATENT DOCUMENTS

| | | | |
|---|---|---|---|
| 2,895,571 | 7/1959 | Hanebeck | 188/99 |
| 2,947,392 | 8/1960 | Heine | 192/3 |
| 4,106,584 | 8/1978 | Matsubara | 180/105 E |
| 4,220,008 | 9/1980 | Wilber et al. | 60/602 |
| 4,635,508 | 1/1987 | Tatsumi | 74/861 X |
| 4,665,692 | 5/1987 | Inaba | 123/323 X |
| 4,669,435 | 6/1987 | Furusawa et al. | 123/323 |
| 4,732,055 | 3/1988 | Tateno et al. | 192/0.075 X |
| 4,750,385 | 6/1988 | Yamamoto et al. | 74/861 X |
| 4,765,201 | 8/1988 | Ishiguro et al. | 74/866 |
| 5,003,483 | 3/1991 | Hedstrom | 364/426.04 |

OTHER PUBLICATIONS

U.S. Application of Naonori Iizuka, U.S. Ser. No. 07/840,271 filed Feb. 24, 1992.

Primary Examiner—Leslie A. Braun
Assistant Examiner—Khoi Q. Ta
Attorney, Agent, or Firm—Ronald P. Kananen

[57] ABSTRACT

An exhaust braking control apparatus for use with an automotive vehicle having an engine and an automatic transmission. The exhaust braking control apparatus includes a control valve situated for movement within an engine exhaust passage to control exhaust gas flow from the engine to the atmosphere. A control unit is provided to produce an engine braking command signal when the automatic transmission is in low gear for engine braking. In the presence of the engine braking command signal, the control valve moves in a closing direction to provide an engine braking effect. The control unit includes an inhibit circuit arranged to interrupt the engine braking command signal during a gear change produced in the automatic transmission from a higher gear to a lower gear. Such a change down is produced when the vehicle speed is less than a reference value. In the event of failure of the inhibit circuit, the reference value is changed to a smaller value.

2 Claims, 2 Drawing Sheets

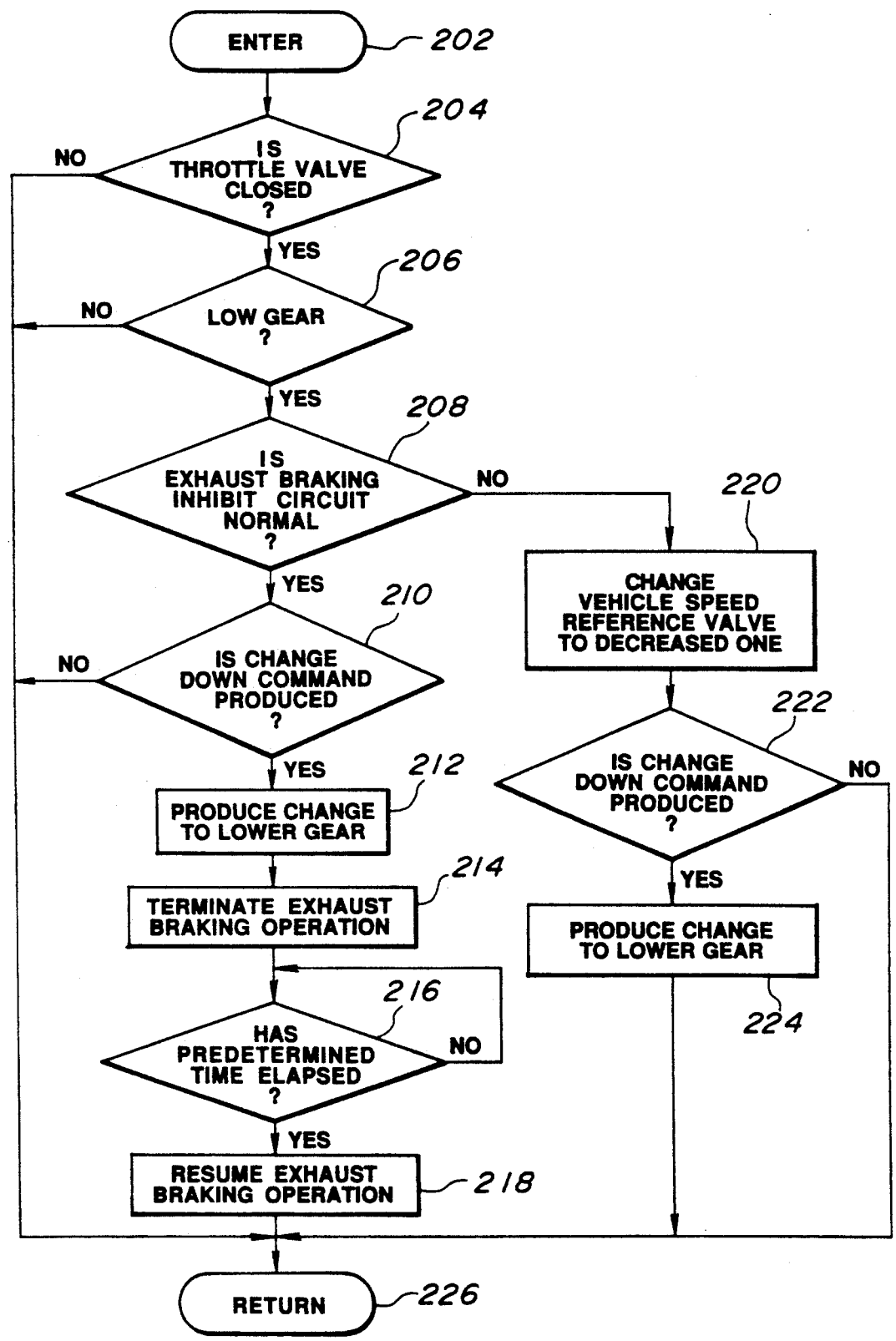

EXHAUST BRAKING CONTROL APPARATUS

BACKGROUND OF THE INVENTION

This invention relates to an exhaust braking control apparatus for controlling exhaust gas flow through an engine exhaust passage to provide an engine braking effect.

It is the current practice to increase an engine braking effect by using a control valve to close the engine exhaust passage, causing the engine to operate like a compressor. For example, Japanese Patent Kokai No. 2-78741 discloses a conventional exhaust braking control apparatus including an exhaust braking inhibit circuit arranged to inhibit the exhaust braking operation during a change produced in the automatic transmission from a higher gear to a low gear for engine braking. This is effective to decrease the engine reversed driving force and thus the shock produced during a gear shifting operation. The working fluid pressure used in the automatic transmission for the gear shifting operation is set at an appropriate level suitable in the absence of the exhaust braking operation. Thus, the torque capacity required during the gear shifting operation for the clutches and brakes provided in the automatic transmission will be short to cause serious problems if the exhaust braking operation continues during the gear shift operation because of a failure of the exhaust braking inhibit circuit.

SUMMARY OF THE INVENTION

It is a main object of the invention to provide an improved exhaust braking control apparatus which can ensure freedom from working fluid pressure shortage caused when exhaust braking continues during a gear shifting operation.

There is provided, in accordance with the invention, an exhaust braking control apparatus for use with an automotive vehicle having an engine, an exhaust passage through which exhaust gases are discharged from the engine to the atmosphere, and an automatic transmission. The exhaust braking control apparatus comprises a control valve situated for movement between a fully-open position and a fully-closed position within the exhaust passage to control exhaust gas flow through the exhaust passage, and a sensor sensitive to vehicle speed for producing a sensor signal indicative of a sensed vehicle speed. The exhaust braking control apparatus also includes a control unit including means for producing an engine braking command signal when the automatic transmission is in a select range for engine braking, means for moving the control valve in a closing direction to provide the exhaust braking effect, means for producing a gear change from a higher gear to a lower gear in the automatic transmission when the sensed vehicle speed is less than a reference value, means for inhibiting the exhaust breaking operation during the gear change produced in the automatic transmission after the engine braking command signal is produced, means for producing a failure signal in the event of failure of the exhaust braking operation inhibiting means, and means responsive to the failure signal for decreasing the reference value.

BRIEF DESCRIPTION OF THE DRAWINGS

This invention will be described in greater detail by reference to the following description taken in connection with the accompanying drawings, in which:

FIG. 2 is a flow diagram showing the programming of the digital computer used in the exhaust braking control apparatus of FIG. 1.

DETAILED DESCRIPTION OF THE INVENTION

Figure 1:
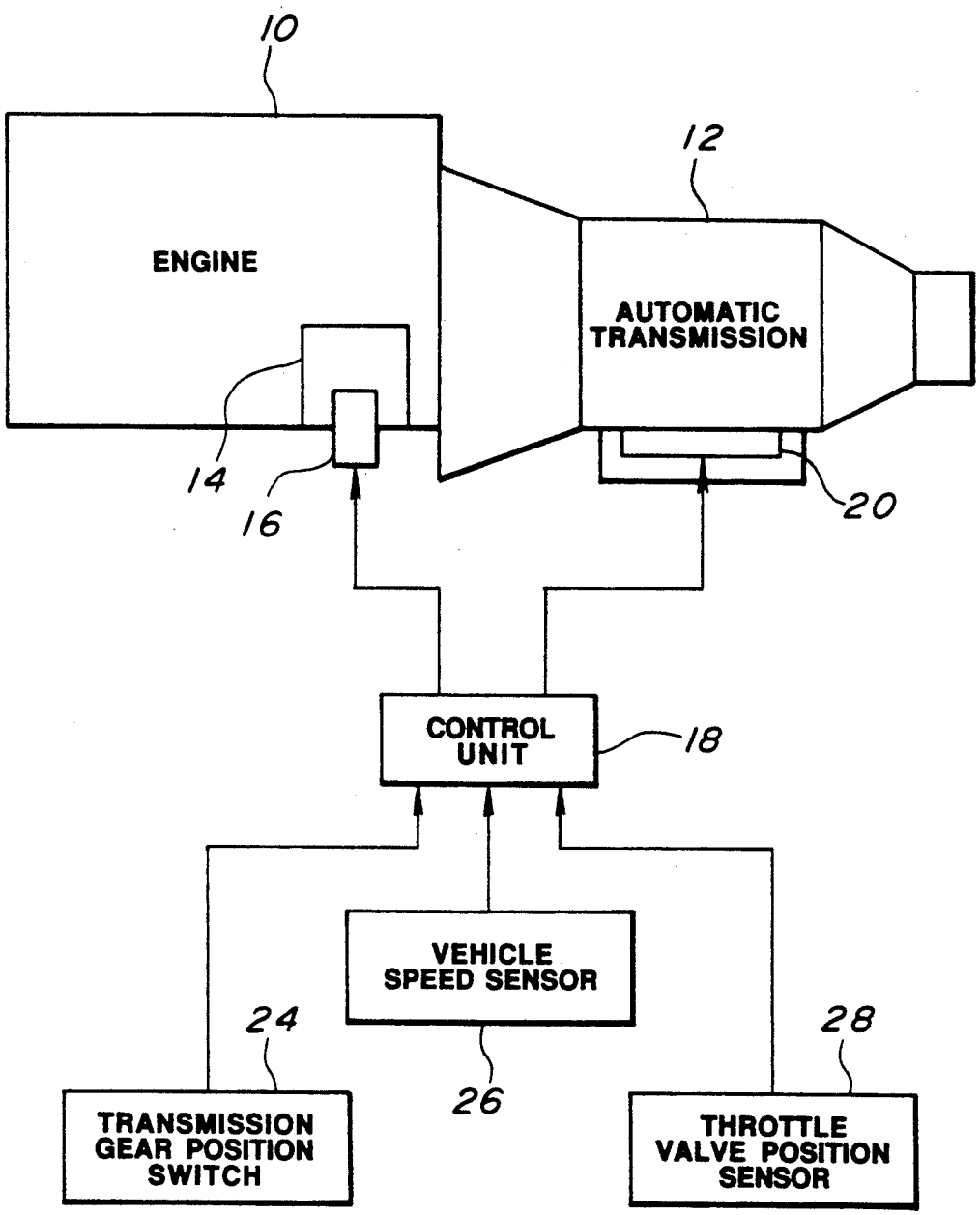
FIG. 1 is a schematic diagram showing one embodiment of an exhaust braking control apparatus made in accordance with the invention.

With reference to the drawings, and in particular to FIG. 1, there is shown a schematic diagram of an exhaust braking control apparatus embodying the invention. The control apparatus is intended for use with an automotive vehicle including an engine 10 and an automatic transmission 12. The engine is equipped with an exhaust braking unit 14 having a valve actuator 16 connected by a mechanical linkage to a control valve (not shown). The control valve is situated for movement between a fully-open position and a fully-closed position within an engine exhaust passage (not shown) for controlling the amount of exhaust gases discharged from the engine 10 to the atmosphere. The valve actuator 16 operates on command from a control unit 18 for moving the control valve in a closing direction toward the fully closed position to provide an engine braking effect. The automatic transmission 12 includes a valve actuator 20. The valve actuator 20 operates, on command from the control unit 18, for oil pressure control and gear shift control in the automatic transmission 12.

The control unit 18 produces an engine braking command signal when the automatic transmission is in low gear for engine braking. The control valve moves in a closing direction toward its fully-closed position to provide an engine braking effect. The control unit 18 includes an inhibit circuit 19 arranged to interrupt the engine braking command signal during a gear change produced in the automatic transmission 12 from a higher gear to a lower gear. Such a change down is produced when the vehicle speed is less than a reference value. In the event of failure of the inhibit circuit 19, the reference value is changed to a smaller value. Since the change down is produced at a lower vehicle speed, a smaller torque capacity is required for the clutches and brakes provided in the automatic transmission.

These controls are made based upon various vehicle operating conditions including transmission gear position, vehicle speed and throttle position. Thus, a transmission select range position switch 24, a vehicle speed sensor 26 and a throttle valve position sensor 28 are connected to the control unit 18. The transmission select range position switch 24 produces a transmission gear position signal indicative of the gear position selected in the automatic transmission 12. The vehicle speed sensor 26 produces an electrical signal indicative of the vehicle speed. The throttle valve position sensor 28 produces an electrical signal indicative of the position of the throttle valve situated within the engine intake passage for controlling the amount of air permitted to enter the engine 10. The control unit 18 may comprise a digital computer which includes a central processing unit (CPU), a random access memory (RAM), a read only memory (ROM) and an input/output control circuit (I/O). The central processing unit communicates with the rest of the computer via a data bus. The read only memory contains the program for operating the central processing unit. When the D (Drive) position is selected in the automatic transmission 12, the control unit 18 produces a command causing the control valve 20 to produce a desired change, for example, among first-to fourth-speed gears, based upon the signals fed thereto from the vehicle speed sensor 26 and the throttle valve position sensor 28.

FIG. 2 is a flow diagram illustrating the programming of the digital computer as it is used to control the engine 10 and the automatic transmission 12. The computer program is entered at the point 202 when a change is produced to low gear for engine braking in the course of vehicle running with the D position being selected in the automatic transmission 12. At the point 204 in the program, a determination is made as to whether or not the throttle valve is in its fully-closed position. This determination is made based upon the signal fed from the throttle valve position sensor 28. If the answer to this question is "yes", then the program proceeds to the point 206. Otherwise, the program proceeds to the point 226 where the program is returned to the point 204. At the point 206 in the program, a determination is made as to whether or not a gear change is produced to the second-speed gear or the other low gear for engine braking. If the answer to this question is "yes", then the program proceeds to the point 208. Otherwise, the program proceeds to the point 226. At the point 208 in the program, a determination is made as to whether or not the exhaust braking inhibit circuit 19 is normal. The exhaust braking inhibit circuit is used to temporarily inhibit the exhaust braking operation of the exhaust braking unit 14. This determination is made based upon the presence of a failure signal produced when the exhaust braking inhibit circuit 19 is subject to failure. If the answer to this question is "yes", then the program proceeds to another determination step at the point 210. This determination is as to whether or not a command has been produced to produce any change from a higher gear to a lower one. If the answer to this question is "yes", then the program proceeds to the point 212. Otherwise, the program proceeds to the point 226. At the point 212 in the program, the digital computer produces a command causing the valve actuator 20 to produce a change to a lower gear. At the point 214 in the program, the digital computer produces a command causing the valve actuator 16 to move the control valve in an opening direction so as to terminate the exhaust braking operation of the exhaust braking unit 14. Following this, the program proceeds to a determination step at the point 216. This determination is as to whether or not a predetermined period of time has elapsed after the exhaust braking operation is terminated. This time period is determined as a function of vehicle speed, gear change mode, and so forth. If the answer to this question is "yes", then the program proceeds to the point 218. Otherwise, the program is returned to the point 216. At the point 218 in the program, the digital computer produces a command causing the valve actuator 16 to move the control valve in a closing direction so as to resume the exhaust braking operation of the exhaust braking unit 14. Thus, the exhaust braking operation is interrupted for a predetermined period of time, that is, during the gear shifting operation. Following this, the program proceeds to the point 226.

If the exhaust braking inhibit circuit 19 is subject to failure, then the program proceeds from the point 208 to the point 220 where the vehicle speed threshold value at which a change is produced in the automatic transmission 12 from a higher gear to a lower one is decreased or changed to a smaller value. The smaller vehicle speed threshold value is used to control the valve actuator 20 at the points 222 and 224. At the point 222 in the program, a determination is made as to whether or not a command has been produced to produce any change from a higher gear to a lower one, that is, when the vehicle speed is less than the decreased vehicle speed threshold value. If the answer to this question is "yes", then the program proceeds to the point 224. Otherwise, the program proceeds to the point 226. At the point 212 in the program, the digital computer produces a command causing the valve actuator 20 to produce a change to a lower gear. Following this, the program proceeds to the point 226.

According to the invention, the vehicle speed threshold value used in determining a change to be produced in the automatic transmission from a higher gear to a lower gear is switched to a smaller one. Thus, the change down is produced at a lower vehicle speed. Because of this, a decreased torque capacity is required during the gear shifting operation for the clutches and brakes provided in the automatic transmission.

While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. An exhaust braking control apparatus for use with an automotive vehicle having an engine, an exhaust passage through which exhaust gases are discharged from the engine to the atmosphere, and an automatic transmission, comprising:
   a control valve situated for movement between a fully-open position and a fully-closed position within the exhaust passage to control exhaust gas flow through the exhaust passage;
   a sensor sensitive to vehicle speed for producing a sensor signal indicative to a sensed vehicle speed;
   a control unit including means for producing an engine braking command signal when the automatic transmission is in a select range for engine braking, means for moving the control valve in a closing direction toward the fully-closed position to provide the exhaust braking effect, means for producing a gear change from a higher gear to a lower gear in the automatic transmission when the sensed vehicle speed is less than a reference value, means for inhibiting the exhaust braking operation during the gear change produced in the automatic transmission after the engine braking command signal is produced, means for producing a failure signal in the event of failure of the exhaust braking operation inhibiting means, and means responsive to the failure signal for decreasing the reference value.

2. The exhaust braking control apparatus as claimed in claim 1, wherein the control unit includes means for changing the reference value to a decreased value.

* * * * *